Dec. 7, 1926.   1,609,429
E. A. ROCKWELL
VARIABLE SPEED DRIVING MECHANISM
Filed Sept. 28, 1921   3 Sheets-Sheet 1

Dec. 7, 1926.

E. A. ROCKWELL 1,609,429

VARIABLE SPEED DRIVING MECHANISM

Filed Sept. 28, 1921    3 Sheets-Sheet 2

Dec. 7, 1926.
E. A. ROCKWELL
1,609,429
VARIABLE SPEED DRIVING MECHANISM
Filed Sept. 28, 1921   3 Sheets-Sheet 3
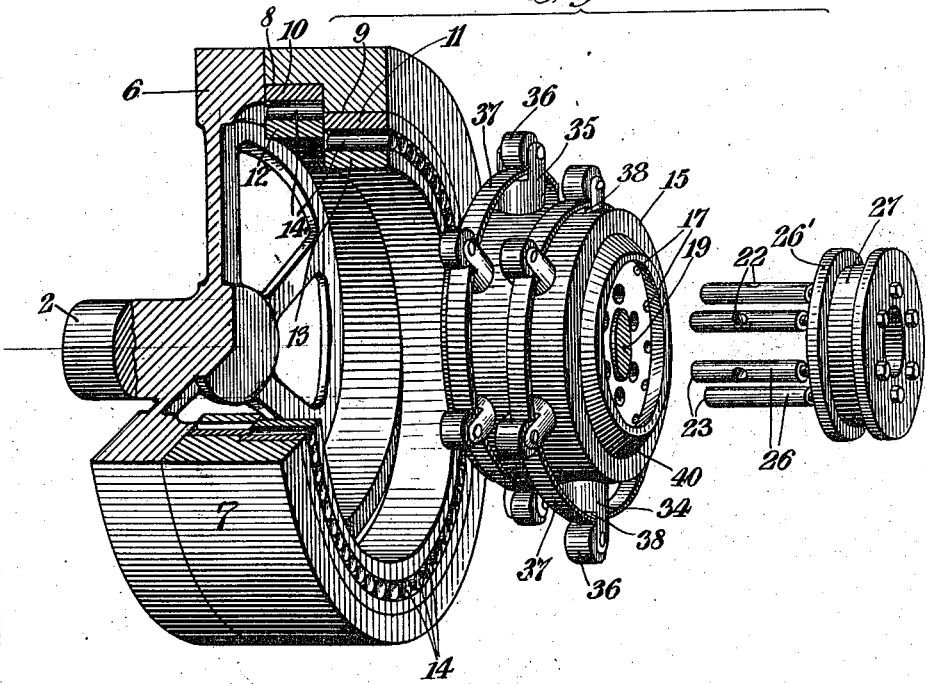
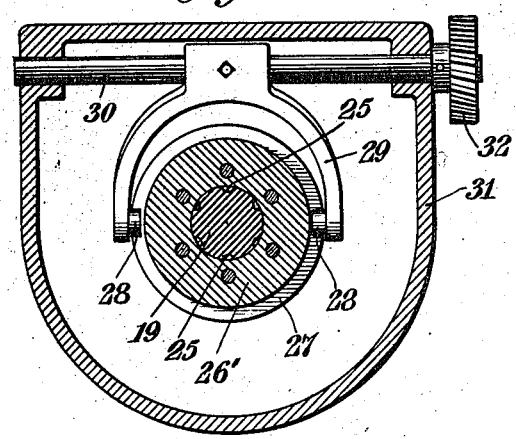
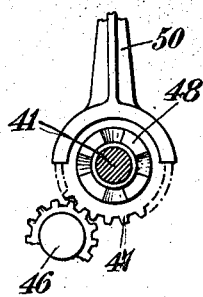

Patented Dec. 7, 1926.

1,609,429

UNITED STATES PATENT OFFICE.

EDWARD A. ROCKWELL, OF FLUSHING, NEW YORK.

VARIABLE-SPEED-DRIVING MECHANISM.

Application filed September 28, 1921. Serial No. 503,900.

This invention relates to a variable speed driving mechanism designed for general use, but more particularly for automobiles.

This invention has as an object the provision of a mechanism whereby variable speeds may be obtained between one rotating body and another rotating body. It has as an object the provision of such a mechanism without the use of gears or strictly mechanical clutches. It has as a further object the provision of such a mechanism which will be adapted for use in any kind of mechanical structure wherein it is desired to produce relative change of rotating velocity between rotating bodies. A still further object of the invention is to provide mechanism of this type which will be inexpensive to construct and yet efficient in operation.

While the invention may take on various forms with respect to its mechanical details, a certain embodiment which is preferred is shown in the accompanying drawings, in which:

Fig. 4 shows a perspective of the eccentrics, piston hub and rod valves;

Fig. 5 illustrates the details of the valve moving mechanism taken on line 5—5 of Fig. 1;

Fig. 6 illustrates an end view along line 6—6 of Figure 1 of the clutch mechanism for direct drive.

Figure 1:
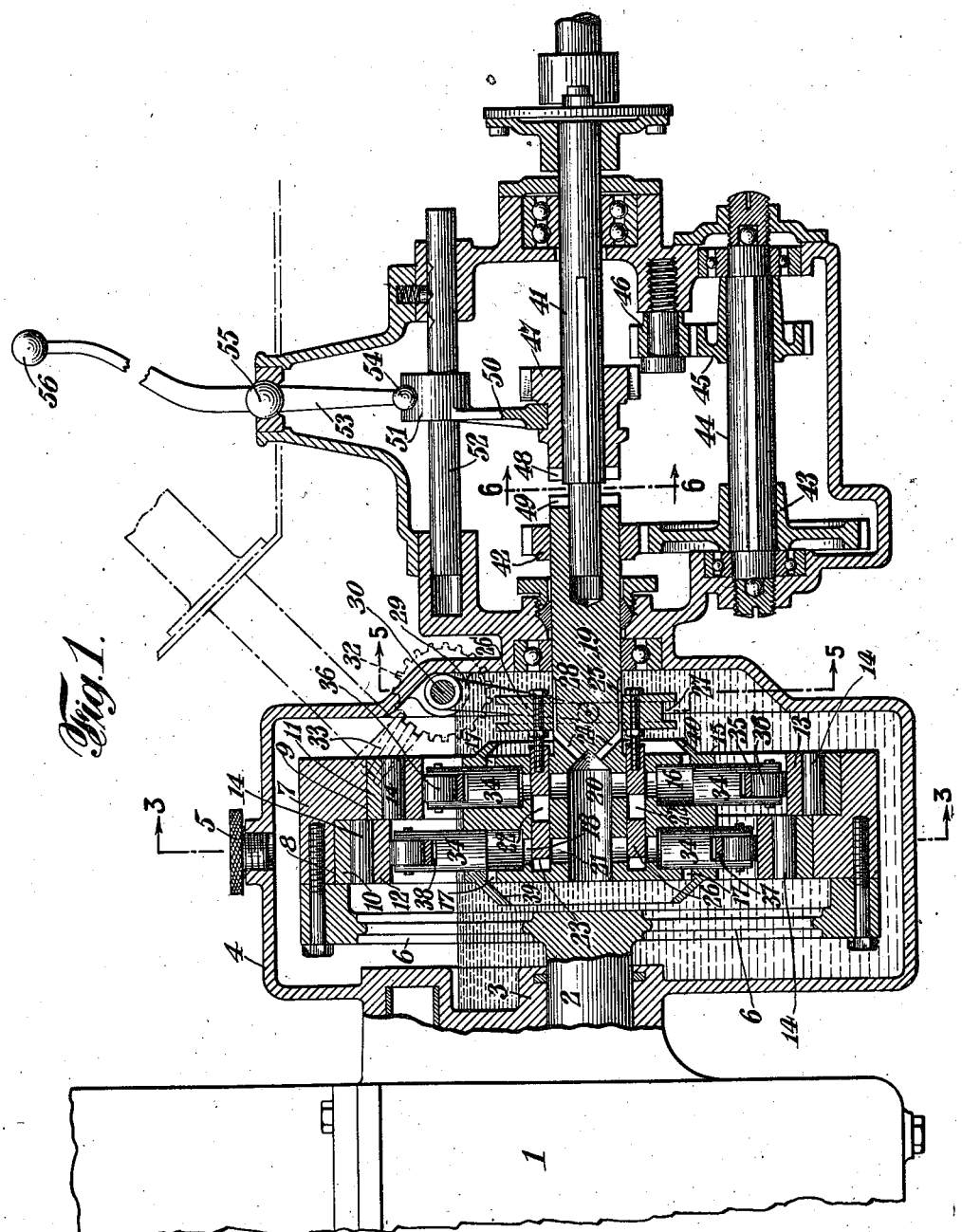
Figure 1 illustrates a section of the mechanism with certain parts in elevation.

In said drawings, an engine 1 is shown having a driving shaft 2 mounted on bearings 3 and connecting directly to the speed driving mechanism within the casing 4. Bearings 3 form part of casing 4 which is annular and surrounds the entire mechanism and is provided with a closure 5. The shaft 2, is connected by arms 6 to a circular ring 7 having two eccentric surfaces 8 and 9 on its inner periphery. The latter are faced with heavy rings 10 and 11 tightly fitted therein, and there are two other floating rings 12 and 13 which are not connected with the rest of the structure but roll on rollers 14 positioned between them and rings 10 and 11.

Within the above mentioned structure is a hub 15 containing along its periphery piston chambers 16 provided with oil admission ports 17 and oil exit ports 18. Said hub is fixed to rotate with shaft 19 which is the driven shaft, and in the end of the latter is an open cylindrical space 20 connected by ports 21 to the exit ports 18. Between exit ports 18 and ports 21 there are spaces occupied by longitudinally movable rod valves 26 having ports 22 positioned to register with the above mentioned ports on the right of the figure, and having ends 23 adjusted to provide ports leading from ports 21 to ports 18 at the left of the figure. The shaft 19 has also ports 24 leading to grooves 25 which in turn lead to the space within the oil chamber 4.

The rod valve actuating mechanism is constructed to move the rods longitudinally back and forth along the shaft 19 so as to change the size of the openings leading from the piston chambers and thereby retard or increase the flow of oil therefrom. This mechanism comprises an enlarged annular ring 26' at the end of the sleeve having therein a groove 27 adapted to receive rollers 28 on a yoke 29 fixedly mounted upon a shaft 30 rotating in a suitable frame 31. At the end of the shaft is a gear 32 operated by a worm 33 adapted to be rotated by a lever on the steering wheel.

Within the piston chambers 16 are pistons 34 having bifurcated ends 35 between which are mounted rollers 36 so as to roll along the interior surfaces of the floating rings 12 and 13. A hoop or band 37 of circular form which may be flexible if desired, is inserted within recesses 38 between rollers 36 and the pistons in order to hold them in circular formation. The hub is provided with an annular cup 39 at the left of the figure and annular cup 40 at the right for the purpose of forcing oil by centrifugal action into openings 17. The oil is shown within an annular casing 4 and is preferably above ports 17 so as always to fill the latter when possible by the outward position of pistons 34.

Shaft 19 is provided with a reversing gear for imparting a reverse turning movement to shaft 41 which is the ultimate driven shaft. This reversing mechanism consists of a gear 42 fixed on shaft 19 meshing with another gear 43 mounted on shaft 44 which has also mounted thereon gear 45 meshing with gear 46, which in turn is adapted to mesh with a gear 47 mounted on shaft 41.

At the end of gear 47 as shown in Fig. 6 are provided simple clutch teeth 48 adapted to enter into recesses 49 in the end of shaft 19, in which position the direct drive between shafts 19 and 41 is secured. Gear 47 is mounted to slide along shaft 41 but keyed to rotate with it and is moved by an arm 50 attached to a yoke 51 mounted for sliding movement with shaft 52, the yoke being actuated by a lever 53 connected to a ball 54 operating in a socket within the said yoke. The lever 53 is pivoted by a suitable joint such as a ball joint at 55 and the other end of the lever 56 is adapted to be operated for shifting the position of gear 47.

Figure 2:
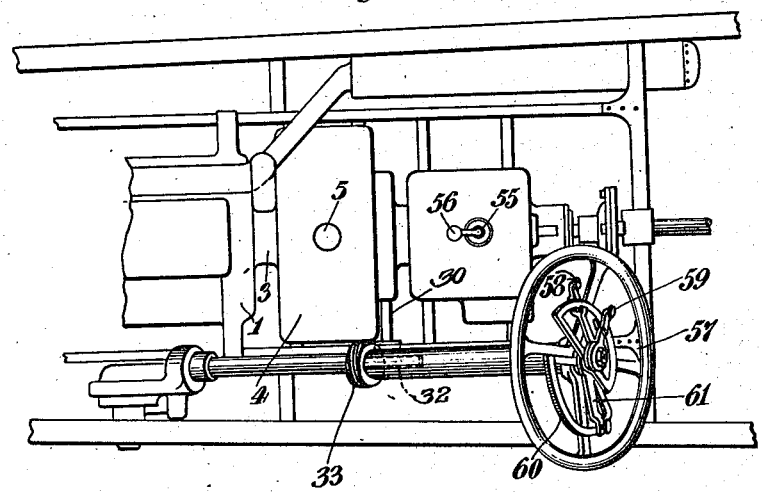
Fig. 2 illustrates a plan view of the steering wheel mounted on the chassis.
Figure 3:
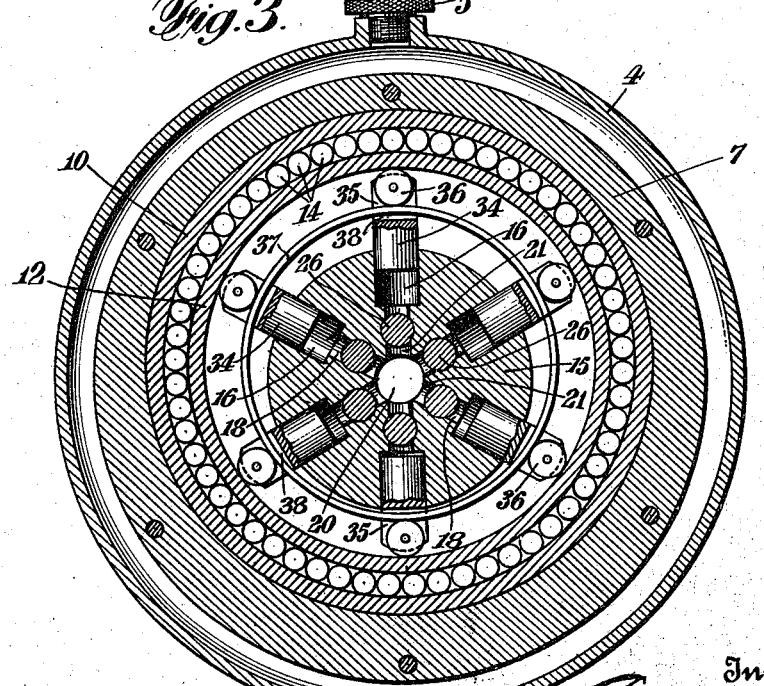
Fig. 3 shows a section of the mechanism along line 3—3 of Fig. 1.

The steering wheel 57 is shown in Fig. 2 mounted on the usual chassis and is provided with the usual throttle and spark levers 58 and 59. There is also mounted on the wheel a graduated arc 60 over which passes an operating arm or lever 61 which operates to rotate by suitable shaft or tubular connections along the steering wheel shaft the worm 33, so that by moving the arm 61 over the arc from one end to the other the rod valves 26 will be moved longitudinally along shaft 19 to open or close valves 18.

The operation of the mechanism will now be described. The engine 1 is run and shaft 2 is rotated and with it the structure represented by 6 and 7 including the eccentric rings 10 and 11. The floating rings 12 and 13 rotate with rings 10 and 11 and are free to roll on rollers 14 at the same time. The motion of the eccentrics forces the pistons 34 down into the piston chambers and during this action there is a slight rolling on the rolls 36 thereby avoiding friction. As the pistons move into the piston chambers, the oil contained therein, having come in through ports 17, is forced out through ports 18, the ports in the sliding valve such as 22, and the ports 21 into chamber 20 and thence into the large oil tank 4. The rapidity of flow of the oil through ports 18 is governed by the position of the rod valves 26, which may of course be set from the steering wheel at any desired position. When the valves 26 are moved way in so that the ports 18 are completely closed, then pistons 34 cannot move at all and the eccentrics therefore grip them tightly with a result that the entire structure, that is, shafts 2 and 19 with the connecting eccentrics, pistons and hub, rotates bodily together. When on the other hand valves 26 are moved to the extreme right so that ports 18 are wide open, then there is no resistance to the flow of the oil and no work is done by the eccentrics on the pistons 34 except to pump oil, wherefore there is no gripping by the eccentrics on the piston rollers 36 and consequently shaft 19 is not rotated. These two positions, therefore, constitute the positions of high speed and rest. In between these positions lie an infinite number of speed ratios depending on the position of valves 26. The smaller the opening of ports 18 is, the greater the speed of shaft 19 with respect to shaft 2. The larger the opening of ports 18, the slower is the rotation of shaft 19 with respect to shaft 2. It is a feature of this invention that at high speeds the rapidity of motion of the oil is slowest, which is a decided advantage since there is no increase of friction nor is there any fast moving part or mechanism. The oil is admitted from the tank 4 through ports 17 when the pistons are extended; and the annular cups 39 and 40 are intended to assist this flow into ports 17 by centrifugal action, although these cups may be omitted. Valves 26 are operated directly from the steering wheel by moving arm 61 over graduated arc 60, whereby worm 33 is rotated to actuate gear 32, turn shaft 30, move yoke 29 and thereby shove valves 26 along shaft 19 longitudinally.

The operation of the reversing gearing will next be described. When lever 56 is moved to the left, arm 50 will be thrown to the right and disengage the clutch teeth 48 of gear 47 from the recesses 49 on shaft 19. In this position (as shown on the drawing) shafts 19 and 41 are disconnected. If now arm 56 be moved further to the left gear 47 will engage 46 and thereby come into operative relation with the train of gears, which will result in imparting a reverse motion to shaft 41 with respect to shaft 19.

Mechanical variations from the preferred embodiment just described are of course possible. As before stated, annular cups 39 and 40 may be omitted and it is not necessary to have two eccentrics. It is also possible to omit floating rings 12 and 13 and rearrange the structure to have rollers 36 roll on eccentrics 10 and 11, but this would cause a great deal of wear on these rollers and therefore the structure has been designed to take most of the wear on rollers 14. In place of rollers 36 other anti-friction devices can be substituted and in place of valves 26 any device for opening and closing ports 18 could be substituted. The oil in annular chamber 4 is preferably at the level illustrated, but it may be lower, in which case the action of cups 39 and 40 would prove to be very helpful in supplying a flow of oil to ports 17. The reversing mechanism shown may of course be replaced by any other suitable mechanism having the same function. Hoop 37 may be replaced by a flexible stout wire or other means.

The merits of the invention will be evident from the above description. There will be provided an infinite number of speed ratios and the mechanism may be instantly set at any one of them by a simple movement of a lever. The higher the speed ratio of the driven shaft with respect to the driving shaft, the lower will be the speed of the oil and the slower will be the motion of the eccentrics on the rollers. Even at low speeds there will be no fast moving parts except the shafts themselves, for it will be clear that the eccentrics do not rotate rapidly over the rollers. No high pressure packing for the oil is necessary since that is maintained under only atmospheric pressure. The oil moreover serves to lubricate all parts of the mechanism and consequently frictional losses are small and the wear and tear is also small. In the case of an automobile it will be possible to change speeds with a simple movement of the arm or lever on the steering wheel without having to move several levers as is now the practice. Not only will it be possible to instantly change the speed ratio by such a simple movement, but it will also be possible to obtain any desired ratio whatsoever. Moreover, the structure of the mechanism is such that when coasting down-hill the shaft 2 can be kept at rest by keeping ports 18 wide open or the latter can be slightly closed by moving arm 61 to a position of very low speed in which case the engine will act as a brake.

While many apparently widely different embodiments of this invention may be made without departing from the spirit thereof, it is to be understood that I do not intend to limit myself to the specific embodiment thereof except as indicated in the appended claims.

I claim:

1. A variable speed driving mechanism comprising a driving and a driven shaft and means for changing their relative speed, comprising a member on the driven shaft having piston chambers, solid unattached pistons within the chambers, means on the driving shaft for actuating the pistons, separate fluid admission and exit ports for the chambers, an oil chamber, openings leading from the chamber exit ports to said oil chamber, a movable valve having openings positioned to register with the aforesaid ports and openings, and means for actuating said valve.

2. A variable speed driving mechanism comprising a driving and a driven shaft and means for changing their relative speed, comprising a member on the driven shaft having piston chambers, solid pistons within the chambers, means on the driving shaft for actuating them, fluid admission and exit ports for the chambers, an oil chamber surrounding the shafts, openings leading from the chamber exit ports to said oil chamber, a movable valve having openings positioned to register with the aforesaid exit ports and openings, and means for actuating said valve.

3. A variable speed driving mechanism comprising a driving and a driven shaft and means for changing their relative speed, comprising a hub on the driven shaft having piston chambers, pistons within the chambers, means on the driving shaft for actuating them, an oil chamber surrounding the shafts, openings in the driven shaft leading from the chamber exit ports to said oil chamber, solid rod valves mounted on the driven shaft having openings positioned to register with the aforesaid openings and ports, and means for actuating said rod valves.

4. A variable speed driving mechanism comprising a driving and a driven shaft and means for changing their relative speed, comprising a central hub on the driven shaft having piston chambers, pistons within the chambers, means on the driving shaft for actuating them, a hoop or band connecting the pistons at their outer ends, fluid admission and exit ports for the chambers, an oil chamber, openings leading from said exit ports to the oil chamber, a valve having openings positioned to register with the aforesaid ports and openings, and means for actuating said valve.

5. A variable speed driving mechanism comprising a driving and a driven shaft and means for changing their relative speed, comprising a hub mounted on one shaft having therein a plurality of radial piston chambers presenting separate ports for the admission and exit of a liquid, pistons mounted in said piston chambers, a hollow eccentric mounted on the other shaft to actuate the pistons, solid movable rod valves on the first mentioned shaft having openings to register with the ports, and means to actuate the valves.

6. A variable speed driving mechanism comprising a driving and a driven shaft and means for changing their relative speed, comprising an eccentric mounted for rotation with the driving shaft, a hub on the driven shaft having piston chambers, solid pistons within the chambers, a fluid admission and an exit port for each of the chambers, an oil chamber, openings leading from the chamber exit ports to said oil chamber, a movable valve having openings positioned to register with the aforesaid ports and openings, and means for actuating said valve.

7. A variable speed driving mechanism comprising a driving and a driven shaft and means for changing their relative speed, comprising an eccentric mounted for rotation with the driving shaft, floating eccentric rings and rollers between the rings and eccentric, a hub on the driven shaft having piston chambers, solid pistons within the chambers, rollers mounted on the piston ends to bear against the rings, fluid admission and exit ports for the chambers, an oil chamber, openings leading from the chamber exit ports to said oil chamber, a movable valve having openings positioned to register with the aforesaid ports and openings, and means for actuating said valve.

8. A variable speed driving mechanism comprising a driving and a driven shaft and means for changing their relative speed, comprising an eccentric mounted for rotation with the driving shaft, a hub on the driven shaft having piston chambers, pistons within the chambers, fluid admission and exit ports for the chambers, an oil chamber surrounding the shafts and eccentric, openings leading from the chamber exit ports to said oil chamber, a movable valve having openings positioned to register with the aforesaid ports and openings, and means for actuating said valve.

9. A variable speed driving mechanism comprising a driving and a driven shaft and means for changing their relative speed, comprising an eccentric mounted for rotation with the driving shaft, a hub on the driven shaft having piston chambers, pistons within the chambers, an oil chamber surrounding the shafts and eccentric, openings in the driven shaft leading from the chamber exit ports to said oil chamber, a rod valve mounted on the driven shaft having openings positioned to register with the aforesaid openings and ports, and means for actuating said valve.

10. A variable speed driving mechanism comprising a driving and a driven shaft and means for changing their relative speed, comprising an eccentric mounted for rotation with the driving shaft, a hub on the driven shaft having piston chambers, pistons within the chambers, a hoop or band connecting the pistons, fluid admission and exit ports for the chambers, an oil chamber, openings leading from said exit ports to the oil chamber, a valve having openings positioned to register with the aforesaid ports and openings, and means for actuating said valve.

11. A variable speed driving mechanism comprising a driving and a driven shaft and means for changing their relative speed, comprising an eccentric mounted for rotation with the driving shaft, floating eccentric rings and rollers between the rings and eccentric, a hub on the driven shaft having piston chambers, pistons within the chambers, rollers mounted on the piston ends to bear against the rings, a hoop or band connecting the pistons, fluid admission and exit ports for the chambers, an annular oil chamber surrounding the shafts and eccentrics, openings in the driven shaft leading from the chamber exit ports to said oil chamber, a movable rod valve mounted on the driven shaft having openings positioned to register with the aforesaid ports and openings, and means for actuating said valve.

12. A variable speed driving mechanism comprising a driving and a driven shaft and means for changing their relative speed comprising a member mounted on one shaft having therein a plurality of radial piston chambers presenting fluid admission and exit ports, a liquid reservoir communicating with said piston chambers through the shaft on which the member containing said chambers is mounted, pistons mounted in said chambers, means mounted on the other shaft to actuate the pistons, movable valves having openings to register with said exit ports, and means to actuate the valves.

13. A variable speed mechanism comprising a driving and a driven shaft and means for changing their relative speed, comprising a member mounted on one shaft having therein a plurality of radial piston chambers presenting separate fluid admission and exit ports, a liquid reservoir communicating with said piston chambers through said exit ports and the shaft on which the member containing said chambers is mounted, pistons mounted in said piston chambers, means mounted on the other shaft to actuate the pistons, movable valves having openings therein to register with said exit ports, and means to actuate the valves.

In testimony that I claim the foregoing, I have hereunto set my hand this 1st day of September, 1921.

EDWARD A. ROCKWELL.